United States Patent
Manssour et al.

(10) Patent No.: US 9,253,794 B2
(45) Date of Patent: Feb. 2, 2016

(54) EFFICIENT SPECTRUM UTILIZATION WITH ALMOST BLANK SUBFRAMES

(75) Inventors: Jawad Manssour, Solna (SE); Konstantinos Dimou, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 355 days.

(21) Appl. No.: 13/310,177

(22) Filed: Dec. 2, 2011

(65) Prior Publication Data

US 2013/0142175 A1 Jun. 6, 2013

(51) Int. Cl.
*H04W 72/04* (2009.01)
*H04W 72/12* (2009.01)
*H04W 84/04* (2009.01)

(52) U.S. Cl.
CPC ........ *H04W 72/1252* (2013.01); *H04W 84/045* (2013.01)

(58) Field of Classification Search
CPC ......................... H04W 84/045; H04W 72/1252
USPC ........................................................ 370/336
See application file for complete search history.

(56) References Cited

U.S. PATENT DOCUMENTS

| | | | |
|---|---|---|---|
| 8,599,782 B2* | 12/2013 | Chung et al. ................. | 370/329 |
| 8,644,209 B2* | 2/2014 | Seo et al. ...................... | 370/315 |
| 2005/0130662 A1 | 6/2005 | Murai | |
| 2006/0007936 A1* | 1/2006 | Shrum et al. ............. | 370/395.21 |
| 2006/0142021 A1 | 6/2006 | Mueckenheim et al. | |
| 2007/0217357 A1 | 9/2007 | Kitakado | |
| 2008/0025214 A1* | 1/2008 | Bettink et al. ................ | 370/230 |
| 2008/0232326 A1 | 9/2008 | Lindoff et al. | |
| 2009/0147742 A1* | 6/2009 | Tsai et al. ..................... | 370/329 |
| 2009/0286563 A1 | 11/2009 | Ji et al. | |
| 2010/0120446 A1* | 5/2010 | Gaal ......................... | 455/452.2 |
| 2010/0135166 A1 | 6/2010 | Ahluwalia | |

(Continued)

FOREIGN PATENT DOCUMENTS

| | | |
|---|---|---|
| JP | 2000269881 A | 5/2000 |
| WO | WO9913670 A1 | 3/1999 |

(Continued)

OTHER PUBLICATIONS

Samsung, "Further Consideration on eICIC ABS pattern" 3GPP reference No. R1-110260, published Jan. 21, 2011.*

(Continued)

*Primary Examiner* — Jung Park
*Assistant Examiner* — Albert Shih
(74) *Attorney, Agent, or Firm* — Withrow & Terranova, PLLC

(57) ABSTRACT

Systems and methods for providing efficient utilization of spectrum in a cellular communication network that applies Almost Blank Subframes (ABSs) are disclosed. In general, the network includes an access node that applies ABSs in the downlink. In one embodiment, the access node identifies UEs for which transmissions are to be scheduled for the uplink using a scheduling scheme that does not require control information for every subframe. The access node then time-aligns scheduling instants of the UEs and subframes in the uplink that correspond to at least some of the ABSs in the downlink. In another embodiment, the access node identifies UEs for which transmissions are to be scheduled for the downlink using a scheduling scheme that does not require control information for every subframe. The access node then time-aligns scheduling instants of the UEs for the downlink and at least a subset of the ABSs in the downlink.

43 Claims, 14 Drawing Sheets

(56) References Cited

U.S. PATENT DOCUMENTS

| | | | |
|---|---|---|---|
| 2010/0172329 A1 | 7/2010 | Yokoyama et al. | |
| 2010/0232285 A1* | 9/2010 | Lee et al. | 370/210 |
| 2011/0261747 A1 | 10/2011 | Wang et al. | |
| 2011/0263260 A1 | 10/2011 | Yavuz et al. | |
| 2012/0151041 A1 | 6/2012 | Gerber et al. | |
| 2014/0133365 A1* | 5/2014 | Peng | H04W 72/042 370/278 |
| 2014/0153535 A1* | 6/2014 | Lei | H04L 1/1861 370/329 |

FOREIGN PATENT DOCUMENTS

| | | |
|---|---|---|
| WO | WO0018164 A1 | 3/2000 |
| WO | WO2011031194 A1 | 3/2011 |

OTHER PUBLICATIONS

Shrivastava et al, "Performance Analysis of Persistent Scheduling for VOIP in WiMAX Networks" IEEE 10th Annual Wireless and Microwave Technology Conference, 2009. WAMICON '09, published Apr. 21, 2009.*

New Postcom, "Downlink Control Signaling Enhancements" 3GPP reference No. R1-112986 publish Oct. 11-14, 2011.*

New Postcom,"Considerations for interactions between FO and TO ICIC" 3GPP reference No. R1-110043, published Jan. 21, 2011.*

Shrivastava et al, "Performance Analysis of Persistent Scheduling for VOIP in WiMAX Networks" IEEE 10th Annual Wireless and Microwave Technology Conference, 2009. WAMIXON '09, published Apr. 21, 2009.*

Susitaival et. al., "LTE coverage improvement by TTI bundling", IEEE 69th Vehicular Technology Conference. VTC Apr. 26, 2009.*

New Postcom, "Downlink Control Signaling Enhancements" 3GPP reference No. R1-112986 publish Oct. 11-14, 2011, <http://www.3gpp.org/ftp/tsg_ran/WG1_RL1/TSGR1_66b/Docs/R1-112986.zip>, [retrieved Sep. 5, 2014].*

New Postcom,"Considerations for interactions between FO and TO ICIC" 3GPP reference No. R3-110043, published Jan. 21, 2011, <http://www.3gpp.org/ftp/tsg_ran/WG3_lu/TSGR3_70bis/Docs/R3-110043.zip>, [retrieved Sep. 15, 2014].*

Shrivastava et al, "Performance Analysis of Persistent Scheduling for VOIP in WiMAX Networks" IEEE 10th Annual Wireless and Microwave Technology Conference, 2009. WAMICON '09, published Apr. 21, 2009 <http://ieeexplore.ieee.org/stamp/stamp.jsp?tp=&arnumber=5207296>, [retrieved Sep. 15, 2014].*

Susitaival et. al., "LTE coverage improvement by TTI bundling", IEEE 69th Vehicular Technology Conference. VTC Apr. 26, 2009 <http://ieeexplore.ieee.org/stamp/stamp.jsp?tp=&arnumber=5073660>, [retrieved Sep. 15, 2014].*

Ericsson ("HARQ operation in case of UL Power Limitation" published Jun. 25-29, 2007; retrieved Dec. 12, 2014 from <http://www.3gpp.org/ftp/tsg_ran/wg2_r12/TSGR2_58bis/Docs/R2-072630.zip >).*

3rd Generation Partnership Project ("Technical Specification Group Radio Access Network; Evolved Universal Terrestrial Radio Access (E-UTRA); Physical Channels and Modulation (Release 8)" Document No. 36.211 published Mar. 2009).*

Alcatel-Lucent, "Blank Subframes for LTE", 3rd Generation Partnership Project (3GPP), Aug. 24-28, 2009, vol. RAN WG1_58, No. R1-093340, 2 pages, Shenzhen, China.

Author Unknown, "3rd Generation Partnership Project: Overall Description Stage 2 (Release 10)", 3rd Generation Partnership Project (3GPP TS 36.300), Sep. 2011, V10.5.0, 194 pages, Valbonne, France.

Author Unknown, "3rd Generation Partnership Project: Protocol Specification (Release 10)", 3rd Generation Partnership Project (3GPP TS 36.331), Sep. 2011, V10.3.0, 296 pages, Valbonne, France.

Author Unknown, "3rd Generation Partnership Project: X2 Application Protocol (X2AP) (Release 10)", 3rd Generation Partnership Project (3GPP TS 36.423), Sep. 2011, V10.3.0, 132 pages, Valbonne, France.

LG Electronics, "Considerations on Coexistence of Frequency and Time Domain ICIC", 3rd Generation Partnership Project (3GPP), Feb. 21-25, 2011, vol. RAN WG1_64, No. R1-110889, 4 pages, Taipei, Taiwan.

New Postcom, "Considerations for Interactions Between FD and TD ICIC", 3rd Generation Partnership Project (3GPP), Jan. 17-21, 2011, vol. RAN WG3_70BIS, No. R3-110043, 3 pages, Dublin, Ireland.

New Postcom, "Downlink Control Signaling Enhancements", 3rd Generation Partnership Project (3GPP), Oct. 10-14, 2011, vol. RAN WG1_66bis, No. R1-112986, 3 pages, Zhuhai, China.

Samsung, "Further Consideration on eICIC ABS Pattern", 3rd Generation Partnership Project (3GPP), Jan. 17-21, 2011, vol. RAN WG4_57AH, No. R4-110260, 3 pages, Austin, Texas.

ZTE, "Remaining Issues on CSI-RS", 3rd Generation Partnership Project (3GPP), Nov. 15-19, 2010, vol. RAN WG1_63, No. R1-105957, 5 pages, Jacksonville, Florida.

International Search Report for PCT/IB2012/054975, mailed Jan. 30, 2013, 13 pages.

International Search Report for PCT/IB2012/056836, mailed Apr. 8, 2013, 18 pages.

Non-Final Office Action for U.S. Appl. No. 13/242,852, mailed May 15, 2013, 13 pages.

Non-Final Office Action for U.S. Appl. No. 13/242,852, mailed Oct. 17, 2013, 14 pages.

Written Opinion for PCT/IB2012/054975, mailed Sep. 19, 2013, 9 pages.

International Preliminary Report on Patentability for PCT/IB2012/054975 mailed Dec. 18, 2013, 9 pages.

International Preliminary Report on Patentability for PCT/IB2012/056836 mailed Jun. 12, 2014, 12 pages.

Final Office Action for U.S. Appl. No. 13/242,852, mailed May 6, 2014, 16 pages.

Final Office Action for U.S. Appl. No. 13/242,852, mailed Jun. 11, 2015, 19 pages.

Author Unknown, "Technical Specification Group Radio Access Network; Evolved Universal Terrestrial Radio Access (E-UTRA); Medium Access Control (MAC protocol specification (Release 9)," Technical Specification 36.321, Version 9.0.0, 3GPP Organizational Partners, Sep. 2009, 47 pages.

Non-Final Office Action for U.S. Appl. No. 13/242,852, mailed Feb. 24, 2015, 15 pages.

Advisory Action for U.S. Appl. No. 13/242,852, mailed Aug. 27, 2015, 3 pages.

Notice of Allowance and Applicant-Initiated Interview Summary for U.S. Appl. No. 13/242,852, mailed Oct. 30, 2015, 29 pages.

* cited by examiner

EFFICIENT SPECTRUM UTILIZATION WITH ALMOST BLANK SUBFRAMES

FIELD OF THE DISCLOSURE

The present disclosure relates to a cellular communication network and more particularly relates to efficient spectrum utilization when applying almost blank subframes in a downlink from an access node (e.g., a macro node or a Closed Subscriber Group (CSG) femto node) in a heterogeneous cellular communication network.

BACKGROUND

The deployment of heterogeneous cellular communication networks, which are referred to herein as Heterogeneous Networks (HetNets), is largely seen as one of the most cost efficient solutions to meeting the constantly increasing demand for higher data rates in the coming generations of cellular systems. Such deployments include several Low Power Nodes (LPNs) of diverse nature (e.g., micro, pico, and femto eNode Bs in the case of 3GPP Long Term Evolution (LTE)). These LPNs transform conventional homogeneous cellular communication network architecture into a fragmented multi-layered architecture.

HetNets are resistant to strains on signal power normally resulting from increasing distance from the transmitting point and are well known to defy the inverse square law of distance by moving base stations (BSs) (i.e., macro nodes and the LPNs) closer to user equipment devices (UEs) and providing similar Quality-of-Service (QoS) throughout the cell area. Thus, HetNet deployments possess an inherent capability to address the limitations implied by channel capacity and provide a uniform user experience throughout the cell area irrespective of user location. The potential of HetNets to bring gains in coverage and capacity are widely acknowledged. The major advantages or benefits can be summarized as:

- Moving the BSs closer to the UEs results in better radio link conditions which in turn leads to higher data rates for UEs connected to LPNs.
- LPN cells provide access to the UEs previously handled by the macro layer, thus reducing the load from the macro cell (called macro offloading) which results in higher availability of resources and thus higher data rates for the users connected to macro nodes.
- In general, HetNet deployments provide uniform data rates within a given area.

However, even though there are significant advantages brought by HetNet architectures, there are a number of concerns to be addressed. For instance, the high number of parameters associated with LPNs, e.g., restrictions on transmission power, access rights, and backhaul capacities, has a direct impact on system performance and makes the selection of LPN type and supported features a highly complicated task. The decision depends mainly on the goal to be achieved with the addition of LPNs (e.g., capacity vs. data rate improvement, or both).

The co-existence of cells with different power levels in HetNets has several implications on system access and mobility procedures. In a macro-only deployment, the cell selection process for the UEs is generally based on the Reference Signal Received Power (RSRP), otherwise known as Received Signal Strength (RSS). This means that the UEs get attached to the cell from which they attain strongest RSS. However, employing this access procedure to HetNets can intensify the interference scenarios in the uplink and can further lead to load imbalance situations where most of the UEs get connected to macro cells while LPN cells are underutilized. In LTE, the power difference between the macro and femto cells is about 23 decibel-milliwatts (dBm). This means that UEs that have a lower path loss to the LPN cell still receive high RSRP from the macro node and therefore are connected to the macro node rather than the LPN. This causes high interference in the uplink, which results in an uneven distribution of UEs in the macro and LPN cell layer.

The aforementioned load imbalance issue has been a topic of several researches. One proposed solution is a concept of "Range Extension" which provides a simulated expansion in the range of the LPN when making a decision on UE association with the LPN. This means that whenever a UE is associating to a LPN, an artificial offset threshold is to be added to the actual RSRP value to be used for the cell association decision. In contrast, in the case of macro node, the association decisions are based on the actual received signal strength in most of the cases. The concept of Range Extension (RE) enables an optimal association of users throughout the coverage area, which leads to enhanced system performance and load reduction from the macro cell at the same time.

The drawback of range extension is that UEs located in the extended range of small cells and connected to LPNs might experience difficulties in correctly receiving downlink control information transmitted by the downlink. Specifically, for LTE, UEs located in the extended range of LPNs and connected to LPNs may experience difficulty in correctly receiving downlink control information in the Physical Downlink Control Channel (PDCCH) since those UEs are experiencing negative downlink geometry. To minimize the effect of high interference onto the PDCCH transmitted by the LPN, Almost Blank Subframes (ABSs) are used. During ABSs at the macro node, there is no data transmission from the macro node, which provides the advantage of low interference to LPN cells.

During an ABS at the macro node, the transmission from the macro node does not contain data or control information, but mainly Common, or Cell-Specific, Reference Signal (CRS). This means that the corresponding uplink subframe (i.e., for LTE, the uplink subframe that occurs 4 Transmit Time Intervals (TTIs) later) in the macro node will have no data transmission either because no Downlink Control Information (DCI) (or control information in general) was transmitted in downlink during the ABS. As a result, resources are not fully utilized leading to a decrease in capacity and spectral efficiency.

SUMMARY

The present disclosure relates to systems and methods that provide efficient utilization of spectrum in a cellular communication network that applies almost blank subframes. In the preferred embodiment, the cellular communication network is a heterogeneous cellular communication network (HetNet). In one embodiment, the HetNet includes an access node that applies almost blank subframes in a downlink from the access node to user equipment devices (UEs) served by the access node. In one particular embodiment, the access node is a macro node. In another particular embodiment, the access node is a femto node, such as a Closed Subscriber Group (CSG) femto cell. Almost blank subframes do not include control information. In order to provide efficient spectrum utilization when using almost blank subframes in the downlink, the access node identifies one or more UEs for which transmissions are to be scheduled using a scheduling scheme that does not require control information for every subframe.

Some exemplary scheduling schemes that do not require control information for every subframe are Transmit Time Interval (TTI) bundling, Semi-Persistent Scheduling (SPS), and Persistent Scheduling (PS). The access node then time-aligns scheduling instants of the one or more UEs and subframes that correspond to at least some of the almost blank subframes in the downlink. In this manner, at least some of the subframes that would normally have no scheduled transmissions as a result of the lack of control information in the almost blank subframes are utilized by the scheduling instants for the one or more UEs.

In one embodiment, in order to provide efficient spectrum utilization in the uplink, the access node identifies one or more UEs for which transmissions are to be scheduled for the uplink using a scheduling scheme that does not require control information for every subframe. Some exemplary scheduling schemes that do not require control information for every subframe are TTI bundling, SPS, and PS. The access node then time-aligns scheduling instants of the one or more UEs and subframes in the uplink that correspond to at least some of the almost blank subframes in the downlink. For the uplink, the subframes in the uplink that correspond to at least some of the almost blank subframes are subframes that occur in the uplink a predefined amount of time after the at least some of the almost blank subframes. In this manner, at least some of the subframes in the uplink that would normally have no scheduled transmissions as a result of the lack of control information in the almost blank subframes are utilized by the scheduling instants for the one or more UEs.

In another embodiment, in order to provide efficient spectrum utilization for the downlink, the access node identifies one or more UEs for which transmissions are to be scheduled for the downlink using a scheduling scheme that does not require control information for every subframe. Some exemplary scheduling schemes that do not require control information for every subframe are SPS and PS. The access node then time-aligns scheduling instants of the one or more UEs for the downlink and at least a subset of the almost blank subframes in the downlink. In this manner, at least some of the almost blank subframes in the downlink that would normally have no scheduled transmissions as a result of the lack of control information in the almost blank subframes are utilized by the scheduling instants for one or more UEs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
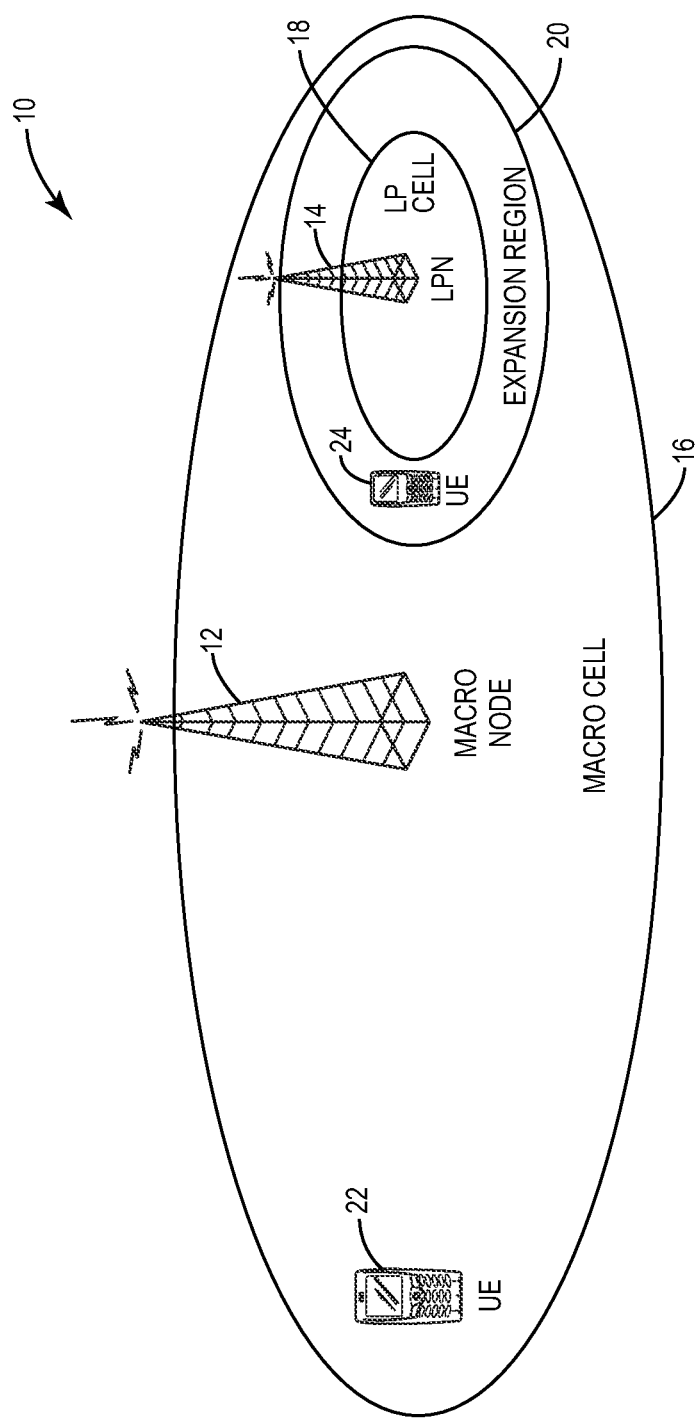
FIG. 1 illustrates a heterogeneous cellular communication network (HetNet) including a macro node and a Low Power Node (LPN) according to one embodiment of the present disclosure.
Figure 4:
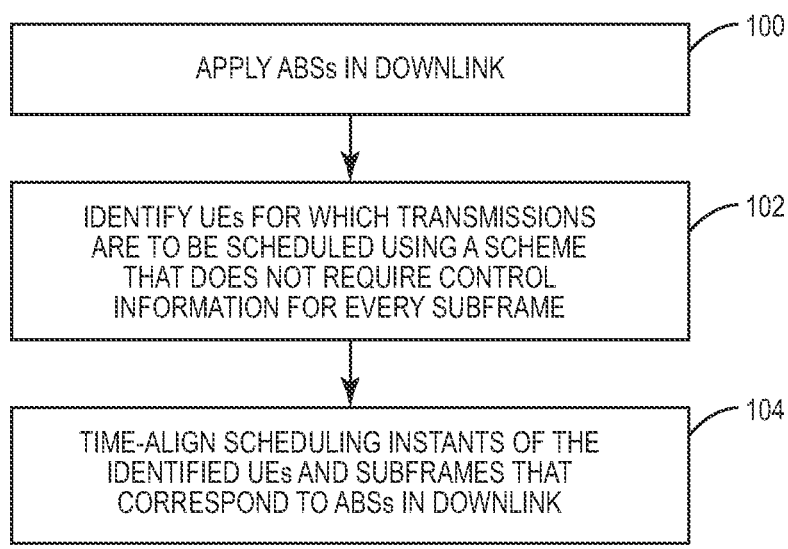
Figure 5:
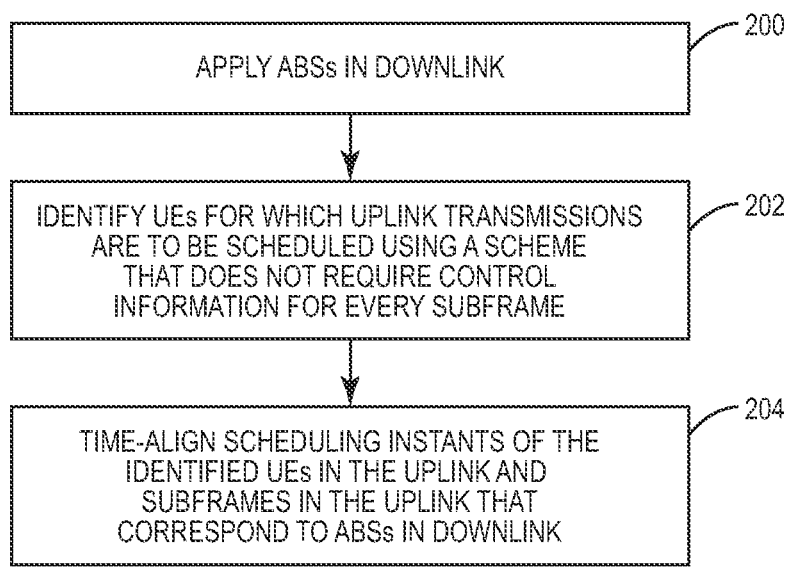
Figure 6:
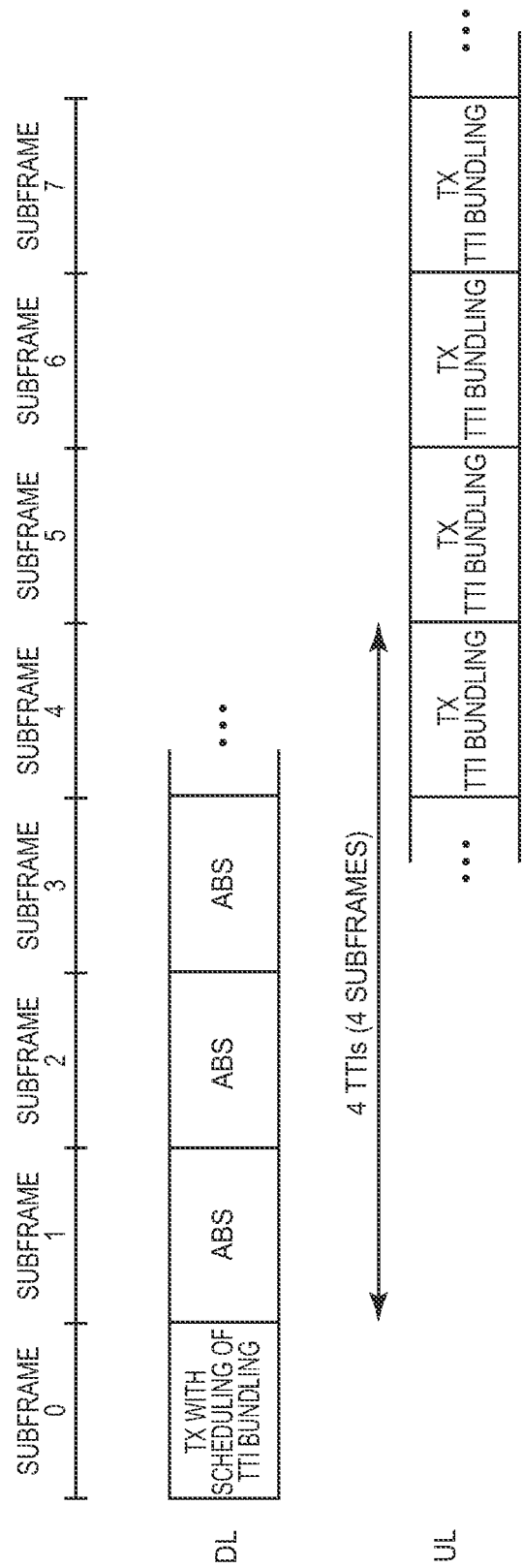
Figure 7:
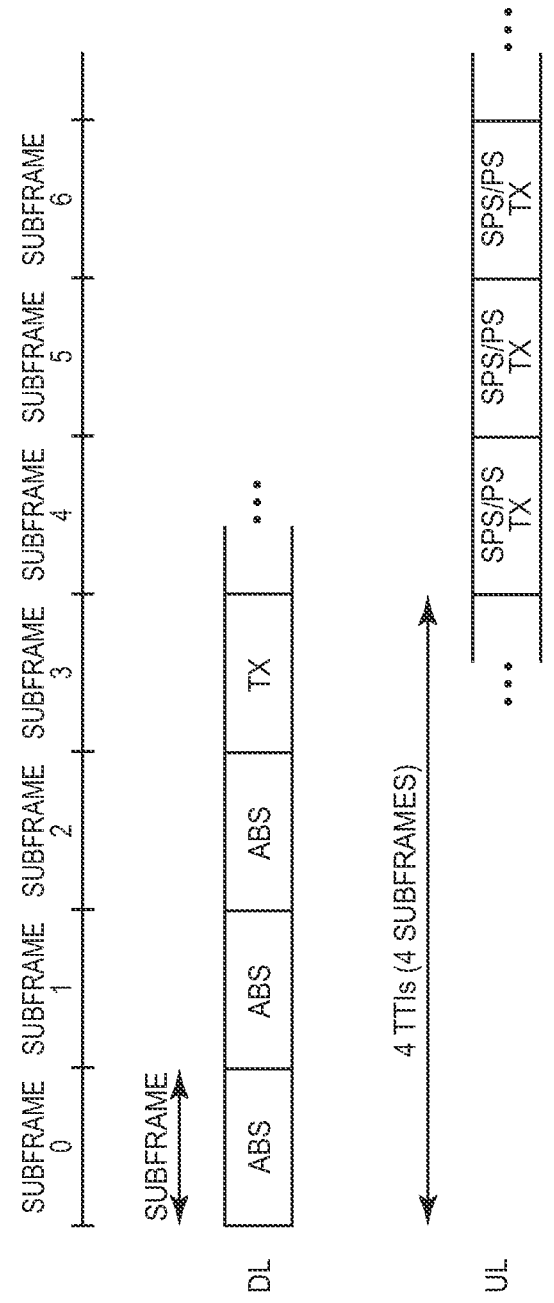
Figure 8:
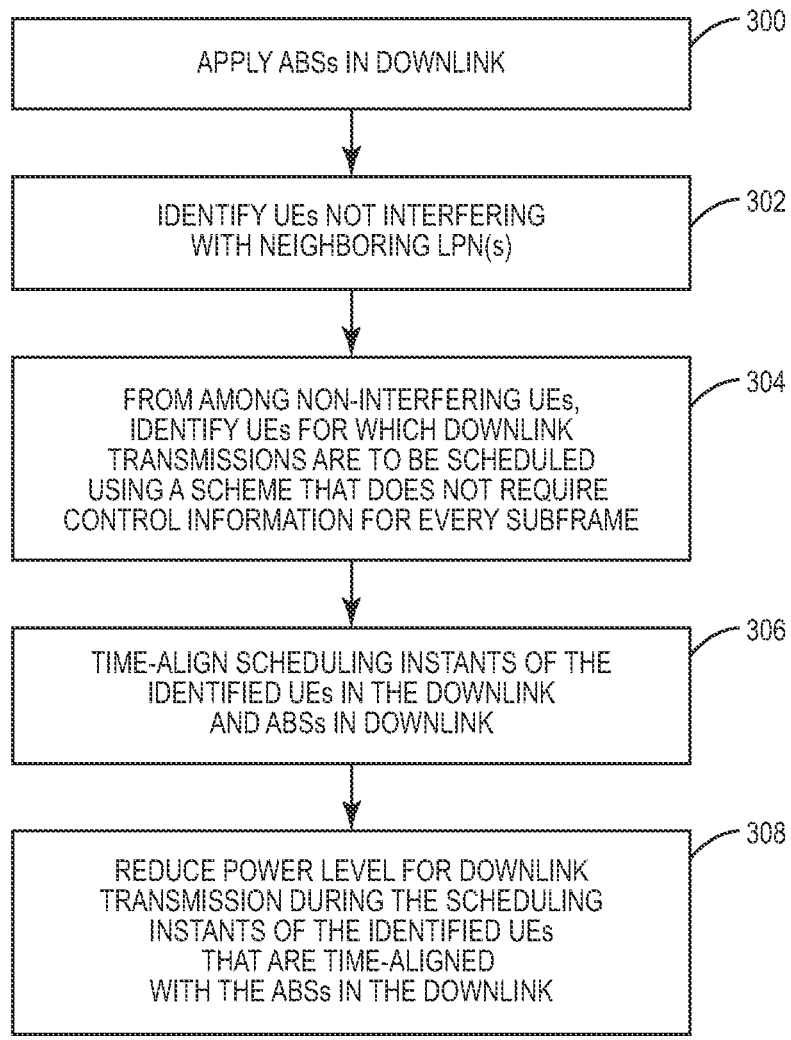
Figure 9:
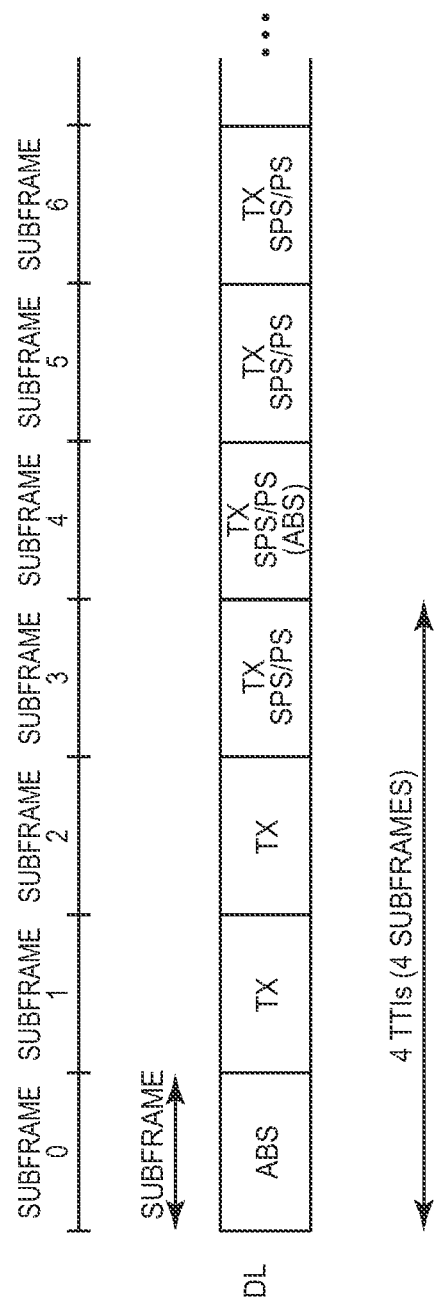
Figure 10:
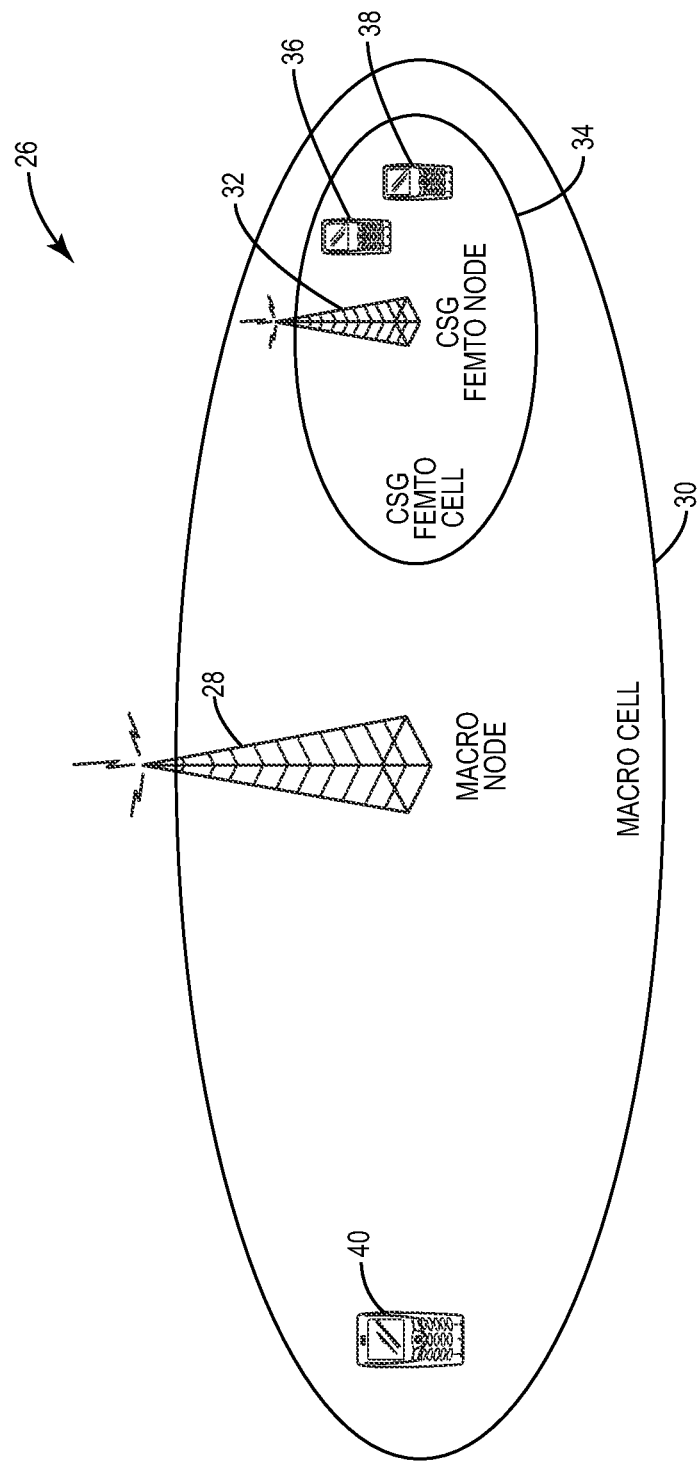
Figure 11:
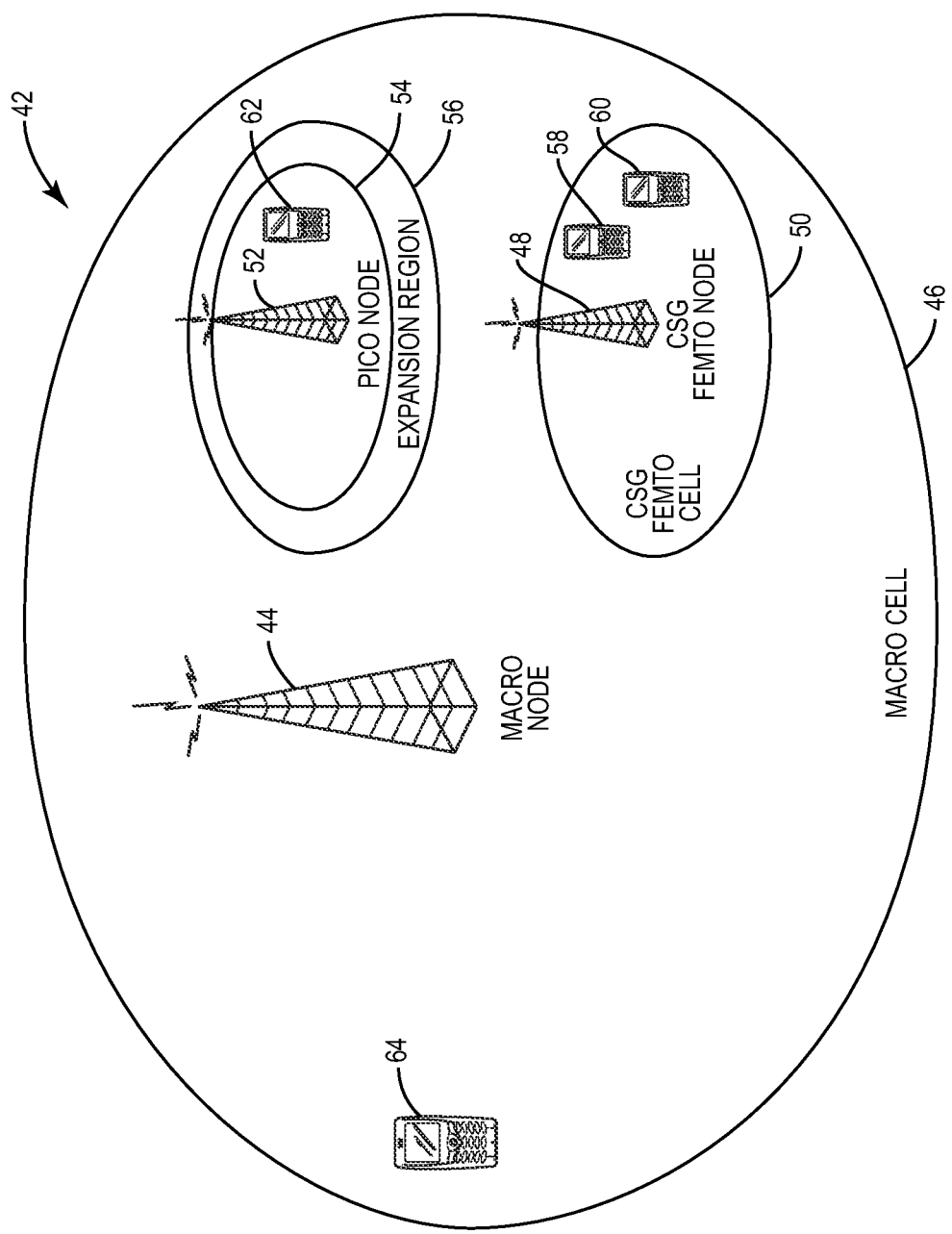
Figure 12:
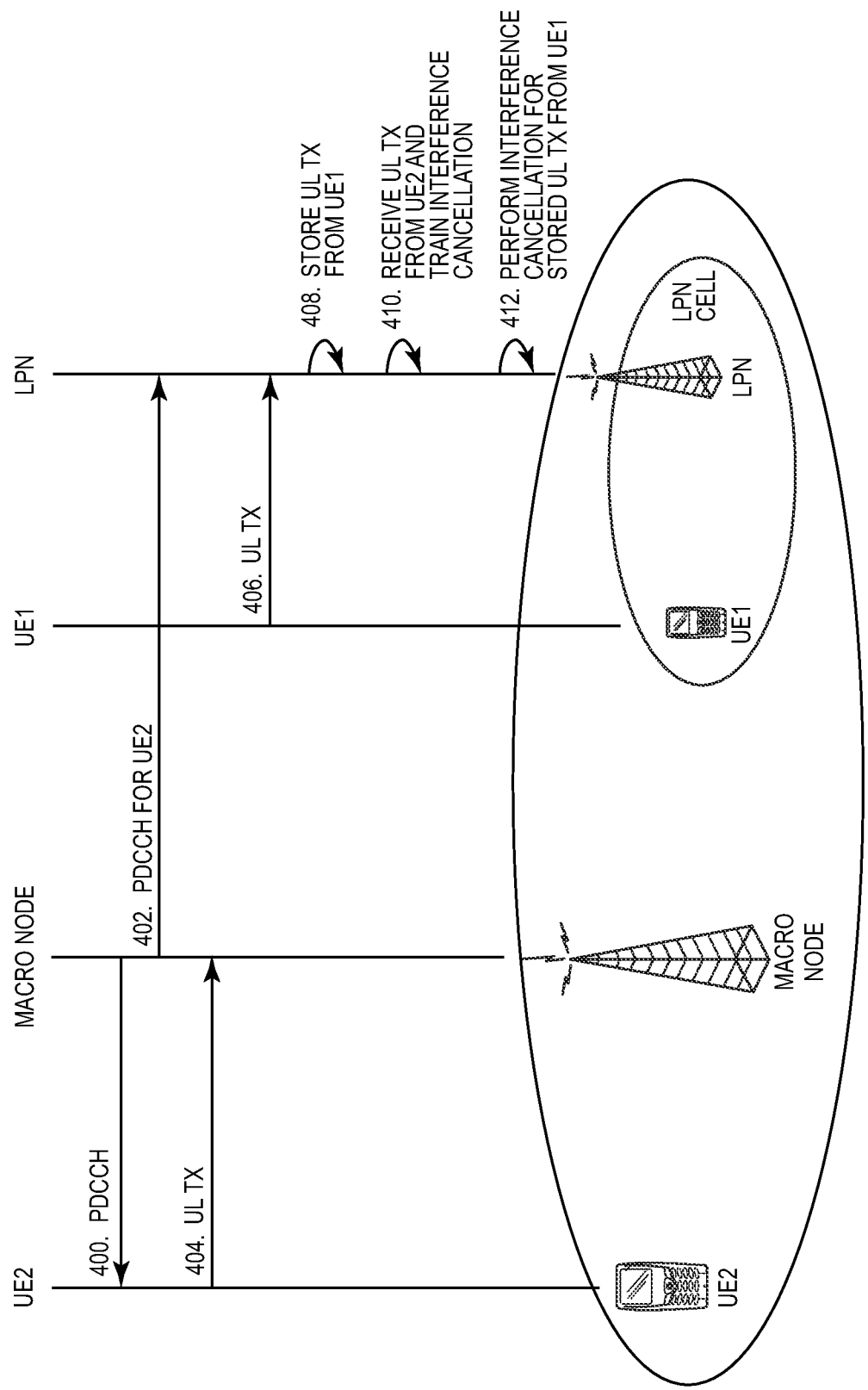
Figure 13:
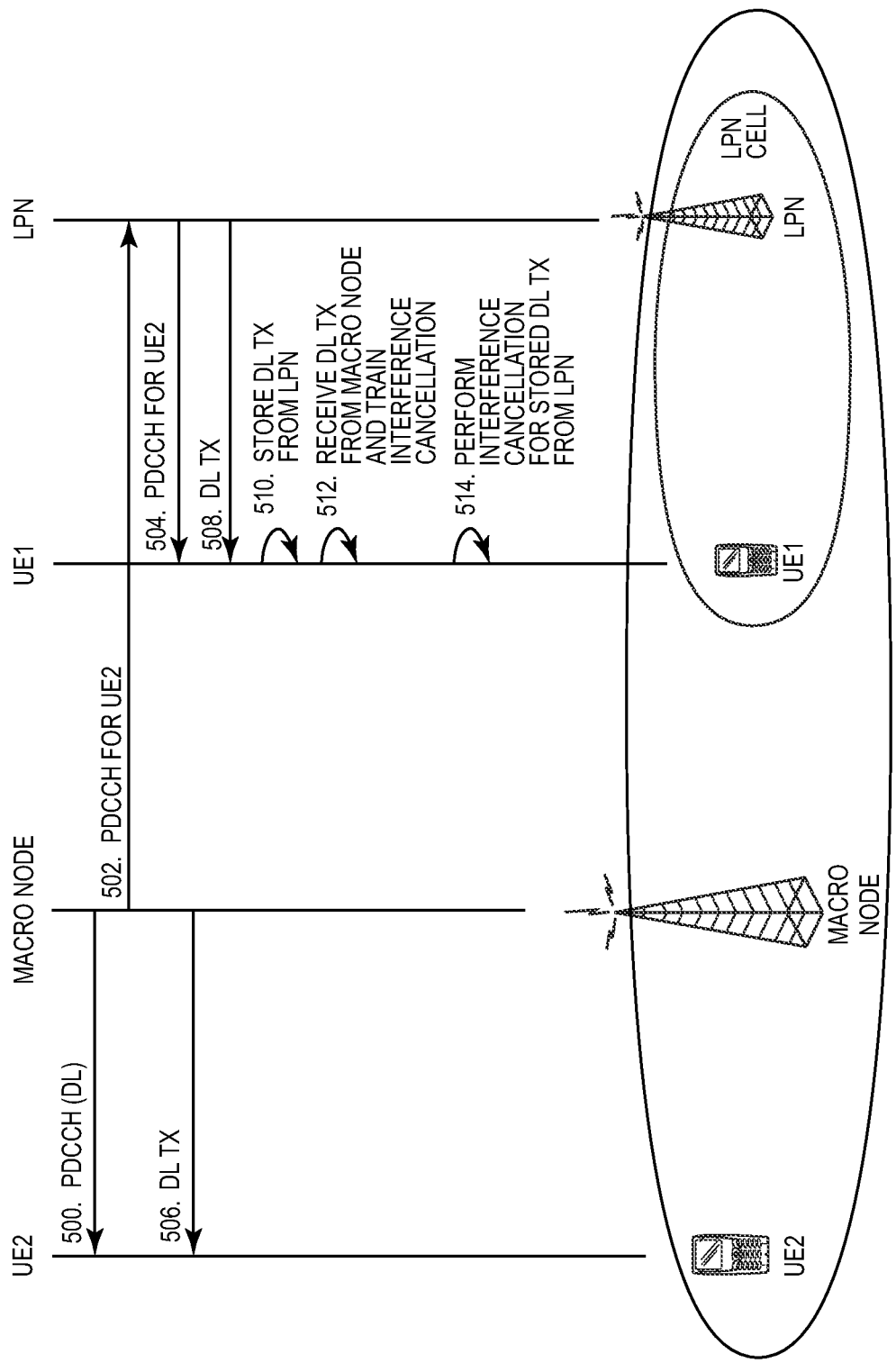
Figure 16:
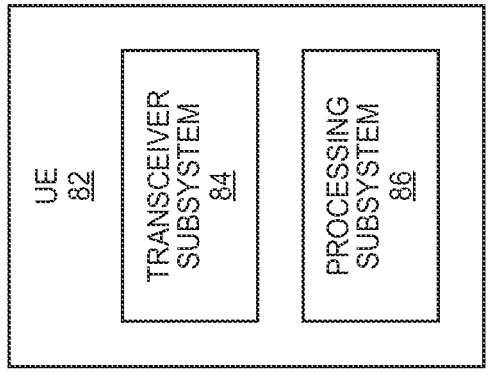
Figure 15:
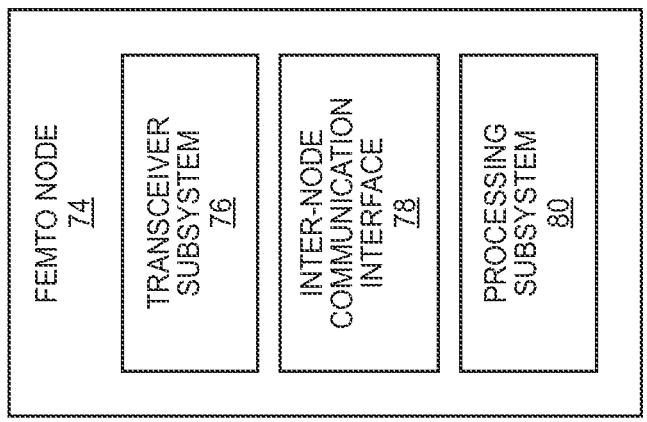
Figure 14:
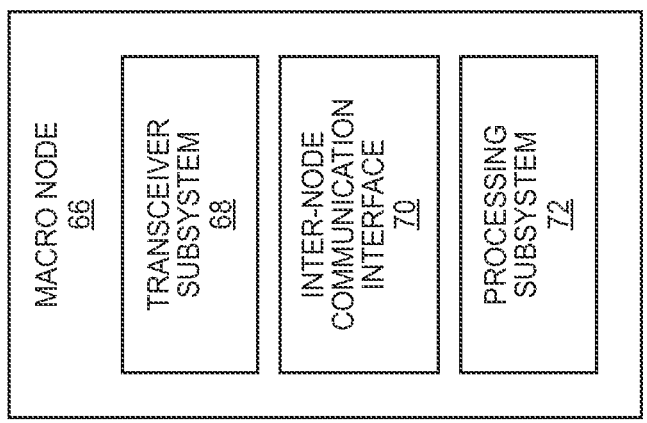

FIG. 4 illustrates the operation of the macro node of FIG. 1 to provide efficient spectrum utilization when applying ABSs in the downlink by time-aligning scheduling instants for one or more user equipment devices (UEs) for which transmissions are scheduled according to a scheduling scheme that does not require control information for every subframe according to one embodiment of the present disclosure;

FIG. 5 illustrates the operation of the macro node of FIG. 1 to provide efficient spectrum utilization for the uplink when applying ABSs in the downlink according to one embodiment of the present disclosure;

FIG. 6 graphically illustrates time alignment of Transmit Time Interval (TTI) bundles for one or more UEs and subframes in the uplink that correspond to ABSs in the downlink according to one embodiment of the process of FIG. 5;

FIG. 7 graphically illustrates time alignment of semi-persistent or persistent scheduling instants of one or more UEs and subframes in the uplink that correspond to ABSs in the downlink according to one embodiment of the process of FIG. 5;

FIG. 8 illustrates the operation of the macro node of FIG. 1 to provide efficient spectrum utilization for the downlink when applying ABSs in the downlink according to one embodiment of the present disclosure;

FIG. 9 graphically illustrates time alignment of semi-persistent or persistent scheduling instants of one or more UEs and subframes in the downlink that correspond to ABSs in the downlink according to one embodiment of the process of FIG. 8;

FIG. 10 illustrates a HetNet including a macro node and a Closed Subscriber Group (CSG) femto node according to another embodiment of the present disclosure;

FIG. 11 illustrates a HetNet including a macro node, a CSG femto node, and a pico node according to another embodiment of the present disclosure;

FIG. 12 illustrates a HetNet that provides uplink interference cancellation according to one embodiment of the present disclosure;

FIG. 13 illustrates a HetNet that provides downlink interference cancellation according to one embodiment of the present disclosure;

FIG. 14 is a block diagram of a macro node according to one embodiment of the present disclosure;

FIG. 15 is a block diagram of a femto node according to one embodiment of the present disclosure; and FIG. 16 is a block diagram of a user equipment device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to systems and methods that provide efficient utilization of spectrum in a heterogeneous cellular communication network (HetNet) that applies almost blank subframes (ABSs). FIG. 1 illustrates a heterogeneous cellular communication network 10 (hereinafter HetNet 10) according to one embodiment of the present disclosure. The discussion below focuses on embodiments where the HetNet 10 operates according to a Long Term Evolution (LTE) standard. Note, however, that the concepts discussed herein are applicable to any type of HetNet 10 that uses ABSs.

As illustrated, the HetNet 10 includes a macro node 12 and a Low Power Node (LPN) 14. The macro node 12 is a base station (e.g., macro eNode B) that serves a corresponding macro cell 16. The LPN 14 is also a base station but transmits at a substantially lower power level than the macro node 12. In addition, the LPN 14 may have other characteristics that are different than those of the macro node 12 (e.g., a different number of antennas). The LPN 14 may be, for example, a micro, pico, or femto eNode B. The LPN 14 serves a corresponding Low Power (LP) cell 18. In addition, the LPN 14 serves an expansion region 20 that surrounds the LP cell 18. The expansion region 20 is a region in which a path loss to the LPN 14 is less than a path loss to the macro node 12 but where a received strength of signal from the macro node 12 is greater than a received strength of signal from the LPN 14. In the illustrated example, a user equipment device (UE) 22 is located in the macro cell 16 and is served by the macro node 12, and a UE 24 is located in the expansion region 20 and is served by the LPN 14. Preferably, transmissions to and from the macro node 12 are synchronized with transmissions to and from the LPN 14.

As discussed below in detail, the macro node 12 applies ABSs in a downlink from the macro node 12. In general, ABSs do not include control information. In one particular embodiment, ABSs do not include control information and also do not include data. However, in another embodiment, ABSs may be either normal power ABSs that do not include control information and do not include data or low power ABSs that do not include control information but do include data. Low power ABSs are transmitted at a low transmit power to reduce interference. The ABSs provide an advantage in that interference particularly for UEs, such as the UE 24, located in the expansion region 20 is reduced. Reduced interference improves the ability of UEs, such as the UE 24, located in the expansion region 20 to successfully receive a Physical Downlink Control Channel (PDCCH) from the LPN 14.

Figure 2:
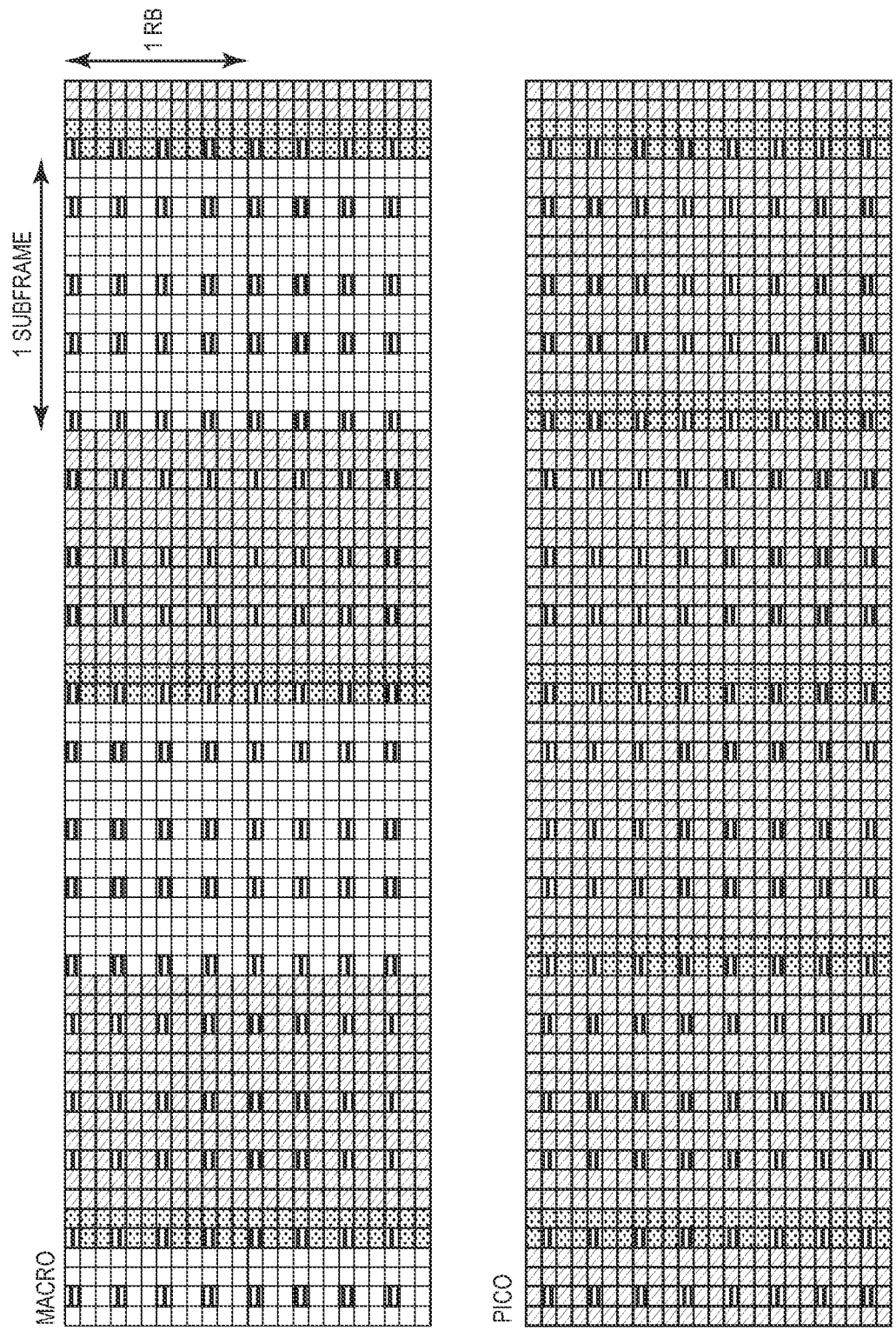
FIG. 2 illustrates exemplary Almost Blank Subframes (ABSs) applied to a downlink from the macro node of FIG. 1.

FIG. 2 illustrates exemplary ABSs in the downlink from the macro node 12. In this example, no data and no control information is transmitted in the ABSs. For instance, for LTE, the ABSs do not include any data transmitted on the Physical Downlink Shared Channel (PDSCH)) or control information transmitted on the Downlink Control Information (DCI) channel. As a result, interference to the UEs, such as the UE 24, located in the expansion region 20 is substantially reduced during the ABSs in the downlink from the macro node 12. However, the use of ABSs in downlink from the macro node 12 normally results in spectral inefficiency and reduced capacity in both uplink to the macro node 12 and, in some implementations, the downlink itself.

Figure 3:
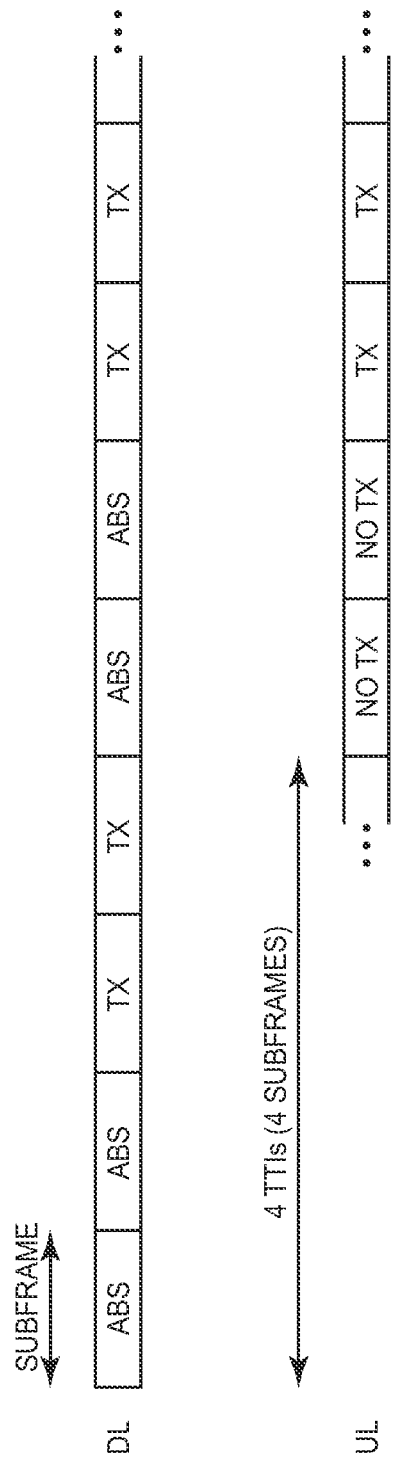
FIG. 3 illustrates an exemplary downlink from the macro node including ABSs and an exemplary uplink to the macro node where the uplink includes subframes in which no transmissions are normally scheduled as a result of the ABSs in the downlink from the macro node.

More specifically, FIG. 3 illustrates an exemplary downlink (DL) transmission pattern at the macro node 12 including ABSs and a corresponding exemplary uplink (UL) at the macro node 12. ABSs do not include control information and also do not include data. As illustrated, downlink includes a number of ABSs arranged according to an ABS pattern. Note that the illustrated ABS pattern is exemplary. Any desired ABS pattern may be used. Because ABSs in the downlink do not contain any control information (i.e., for LTE, the ABSs do not contain the DCI, which includes the PDCCH, the Physical Hybrid-ARQ Indicator Channel (PHICH), and the Physical Control Format Indicator Channel (PCFICH)), ABSs do not contain control information to schedule transmissions in corresponding subframes of the uplink. As a result, no transmissions are scheduled for the corresponding subframes of the uplink. As illustrated, for LTE, the corresponding subframes in the uplink are subframes that occur four Transmit Time Intervals (TTIs) after the ABSs.

As illustrated in FIGS. 2 and 3, normally when using ABSs in downlink, there is spectral inefficiency due to ABSs themselves in the downlink and subframes in the uplink for which no transmissions are scheduled as a result of the ABSs in the downlink. FIG. 4 is a flow chart that illustrates the operation of the macro node 12 of FIG. 1 according to one embodiment of the present disclosure. In general, when using ABSs in the downlink, the macro node 12 operates to fill at least some of the corresponding subframes in the downlink/uplink that would normally contain no transmissions due to the lack of control information in ABSs with transmissions scheduled according to scheduling schemes that do not require control information for every subframe of the transmissions.

As illustrated, the macro node 12 applies ABSs to the downlink (step 100). The ABSs are arranged in the downlink according to a desired ABS pattern. The ABS pattern may be a predefined or predetermined ABS pattern. Alternatively, the macro node 12 may adjust the ABS pattern as discussed below. In addition, the macro node 12 identifies one or more UEs for which transmissions are to be scheduled using a scheduling scheme that does not require control information for every subframe (step 102). Note that the ordering of steps 100 and 102 may be reversed. In one embodiment, the scheduling scheme is TTI bundling. For TTI bundling, a single transmission grant to a UE is a grant for the entire TTI bundle, which for LTE is four consecutive TTIs, which is equivalent to four consecutive subframes. Thus, as discussed above, TTI bundling may be used to schedule a TTI bundle that overlaps subframes that correspond to ABSs in the downlink. In another embodiment, the scheduling scheme is a semi-persistent or persistent scheduling scheme where a single transmission grant to a UE is a grant for transmissions spanning one or more subframes at a defined periodicity. Note that TTI bundling, semi-persistent scheduling (SPS), and persistent scheduling (PS) are suitable scheduling schemes that can be used for LTE. However, these types of scheduling schemes and potentially other suitable scheduling schemes may be used if the HetNet 10 operates according to another standard.

Lastly, the macro node 12 time-aligns scheduling instants for the one or more UEs identified in step 102 with subframes that correspond to at least some of the ABSs in the downlink from the macro node 12 (step 104). More specifically, for TTI bundling, the TTI bundles for the UE(s) are time-aligned with the subframes in the uplink/downlink that correspond to ABS(s) in the downlink. Likewise, for SPS or PS, the periodic scheduling instants for the UE(s) are time-aligned with subframes in the uplink/downlink that correspond to ABSs in the downlink from the macro node 12. In one embodiment, time-alignment is performed by scheduling the transmissions for the one or more UEs to be time-aligned with ABSs in a predefined or predetermined ABS pattern.

FIG. 5 is a flow chart that illustrates the operation of the macro node 12 of FIG. 1 to provide efficient spectrum utilization for the uplink when applying ABSs in the downlink according to one embodiment of the present disclosure. In general, when using ABSs in the downlink, the macro node 12 operates to fill at least some of the corresponding subframes in the uplink that would normally contain no transmissions due to the lack of control information in the ABSs with transmissions (i.e., scheduling instants) scheduled according to scheduling schemes that do not require control information for every subframe of the transmissions.

As illustrated, the macro node 12 applies ABSs to the downlink (step 200). The ABSs are arranged in the downlink according to a desired ABS pattern. The ABS pattern may be a predefined or predetermined ABS pattern. Alternatively, the macro node 12 may adjust the ABS pattern as discussed below. In addition, the macro node 12 identifies one or more UEs for which uplink transmissions are to be scheduled using a scheduling scheme that does not require control information for every subframe (step 202). In other words, the scheduling scheme is any type of scheduling scheme that does not require that all subframes of the downlink include control information to schedule transmissions for corresponding subframes in the uplink. Note that the ordering of steps 200 and 202 may be reversed.

More specifically, in one embodiment, the scheduling scheme is TTI bundling. For TTI bundling, a single transmission grant to a UE is a grant for the entire TTI bundle, which for LTE is four consecutive TTIs (i.e., four consecutive subframes). Thus, TTI bundling may be used to schedule a TTI bundle in the uplink that overlaps subframes that correspond to ABSs in the downlink. In another embodiment, the scheduling scheme is a semi-persistent or persistent scheduling scheme where a single transmission grant to a UE for the uplink is a grant for transmissions spanning one or more subframes in the uplink at a defined periodicity. Note that TTI bundling, SPS, and PS are suitable scheduling schemes that can be used for LTE. However, these types of scheduling schemes and potentially other suitable scheduling schemes may be used if the HetNet 10 operates according to another standard.

Lastly, the macro node 12 time-aligns scheduling instants in the uplink for the one or more UEs identified in step 102 with subframes in the uplink that correspond to at least some of the ABSs in the downlink from the macro node 12 (step 204). The subframes in the uplink that correspond to the ABSs in the downlink are subframes in the uplink that occur in the uplink a predefined amount of time after the corresponding ABSs in the downlink. For LTE, the corresponding subframes in the uplink are subframes that occur in the uplink four TTIs, or four subframes, after the ABSs in the downlink. More specifically, for TTI bundling, the TTI bundles for the UE(s) in the uplink are time-aligned with the subframes in the uplink that correspond to ABS(s) in the downlink. Note that when using TTI bundling, the macro node 12 may identify the UEs that are to use TTI bundling and then schedule transmissions (i.e., scheduling instants) for those UEs using a desired weighting or prioritization scheme. The weighting or prioritization scheme may consider, for example, the type of data to be transmitted. For SPS or PS, the periodic scheduling instants for the UE(s) are time-aligned with subframes in the uplink that correspond to ABSs in the downlink from the macro node 12. In one embodiment, the ABS pattern is predetermined, and time-alignment is performed by aligning the scheduling instants with subframes in the uplink that correspond to at least some of the ABSs in the predetermined ABS pattern. In another embodiment, the ABS pattern is adjustable, and time-alignment is performed by adjusting the ABS pattern to achieve time-alignment of the scheduling instants with subframes in the uplink that correspond to at least some of the ABSs in the downlink.

FIG. 6 graphically illustrates time alignment of TTI bundles for one or more UEs and subframes in the uplink to the macro node 12 that correspond to ABSs in the downlink from the macro node 12 according to one embodiment of the process of FIG. 5. As illustrated, the downlink (DL) from the macro node 12 includes a series of subframes including a first subframe that includes a normal transmission along with control information (e.g., DCI) that schedules a TTI bundle in the uplink (UL). The first subframe in the downlink is followed by three ABSs. Specifically, subframe 0 of the downlink is a normal transmission that includes the control information that schedules the TTI bundle in the uplink. Subframes 1, 2, and 3 of the downlink are ABSs. As a result of the control information, a TTI bundle (i.e., for LTE, four consecutive subframes transmitting the same data) is transmitted in the uplink starting at subframe 4 and continuing through subframe 7 of the uplink.

Normally, the ABSs in subframes 1, 2, and 3 of the downlink would result in no transmissions being scheduled for subframes 5, 6, and 7 of the uplink. However, by scheduling the TTI bundle appropriately, the TTI bundle overlaps subframes 5, 6, and 7 of the uplink. In other words, by scheduling the TTI bundle appropriately, subframes in the uplink that would have been unused as a result of the ABSs in the downlink are now used for transmission of the TTI bundle. In this manner, the macro node 12 provides efficient spectrum utilization in the uplink to the macro node 12 when using ABSs in the downlink from the macro node 12.

FIG. 7 graphically illustrates time alignment of semi-persistent or persistent scheduling instants of one or more UEs and subframes in the uplink to the macro node 12 that correspond to ABSs in the downlink from the macro node 12 according to another embodiment of the process of FIG. 5. As illustrated, the downlink (DL) from the macro node 12 includes a series of ABSs. Specifically, subframes 0, 1, and 2 of the downlink are ABSs. Normally, the ABSs in subframes 0, 1, and 2 of the downlink would result in no transmissions being scheduled for subframes 4, 5, and 6 of the uplink (UL). However, semi-persistent or persistent transmissions scheduled according to a semi-persistent or persistent scheduling scheme are time-aligned with subframes 4, 5, and 6 of the uplink. In other words, using transmission instants of UEs scheduled using semi-persistent or persistent scheduling, subframes in the uplink that would have been unused as a result of the ABSs in the downlink are now used for the transmission instants of the UEs. In this manner, the macro node 12 provides efficient spectrum utilization in the uplink to the macro node 12 when using ABSs in the downlink from the macro node 12.

FIG. 8 is a flow chart that illustrates the operation of the macro node 12 of FIG. 1 to provide efficient spectrum utilization for the downlink when applying ABSs in the downlink according to one embodiment of the present disclosure. As discussed above, the ABSs do not include control information. In addition, for this embodiment, the ABSs preferably do not include data. In general, when using ABSs in the downlink, the macro node 12 operates to fill at least some of the ABSs in the downlink with data transmissions (i.e., scheduling instants) scheduled according to scheduling schemes that do not require control information for every subframe of the transmissions.

As illustrated, the macro node 12 applies ABSs to the downlink (step 300). The ABSs are arranged in the downlink according to a desired ABS pattern. Again, the ABS pattern may be a predefined or predetermined ABS pattern. Alternatively, the macro node 12 may adjust the ABS pattern as discussed below. In addition, the macro node 12 identifies one or more UEs that are determined to be non-interfering with any neighboring LPNs such as the LPN 14 (step 302). For instance, the UEs that are determined to be non-interfering may be UEs that are located near the macro node 12 as determined by, for example, received strength of signal (e.g., have a received strength of signal for the downlink from the macro node 12 that is greater than a predefined threshold). As another example, the UEs that are determined to be non-interfering may be UEs that are located far from the LPN 14 as determined by, for example, received strength of signal (e.g., have a received strength of signal for the downlink from the LPN 14 that is less than a predefined threshold).

From among the non-interfering UEs identified in step 302, the macro node 12 identifies one or more UEs for which downlink transmissions are to be scheduled using a scheduling scheme that does not require control information for every subframe (step 304). In one embodiment, the scheduling scheme is SPS, PS, or a similar scheduling scheme. Note that LTE does not currently provide TTI bundling for the downlink. However, if the HetNet 10 were to operate according to a standard that did provide TTI bundling in the downlink, then the scheduling scheme may also be TTI bundling. Note that the ordering of steps 300, 302, and 304 may be altered (e.g., steps 302 and 304 may be performed before step 300).

Next, the macro node 12 time-aligns scheduling instants for the one or more UEs identified in step 304 with at least some of the ABSs in the downlink from the macro node 12 (step 306). More specifically, for SPS or PS, the periodic scheduling instants for the UE(s) are time-aligned with at least some of the ABSs in the downlink from the macro node 12. Lastly, the macro node 12 reduces a transmit power level for downlink transmission during transmission of the scheduling instants of the UEs that are time-aligned with the ABSs in the downlink (step 308). Notably, when reducing the transmission power, the macro node 12 preferably notifies the UEs of the reduced transmission power. This notification may be provided via, for example, Radio Resource Control (RRC) signaling. As another example, the UEs may have predefined transmit modes that operate at different power levels, where the macro node 12 may notify the UEs of the transmission power level via UE-specific reference signals.

FIG. 9 graphically illustrates time alignment of semi-persistent or persistent scheduling instants of one or more UEs and ABSs in the downlink from the macro node 12 according to one embodiment of the process of FIG. 8. As illustrated, the downlink (DL) from the macro node 12 includes ABSs. Specifically, in this example, subframes 0 and 4 of the downlink are ABSs, which normally do not contain data and do not include control information. However, semi-persistent or persistent transmissions scheduled according to a semi-persistent or persistent scheduling scheme are time-aligned with subframes 3 through 6 of the downlink such that data is transmitted during the ABS of subframe 4. In other words, using transmission instants of UEs scheduled using semi-persistent or persistent scheduling, subframe 4 in the downlink that would have been unused as a result of being an ABS is now used for the transmission instants of the UEs. In this manner, the macro node 12 provides efficient spectrum utilization in the downlink from the macro node 12 when using ABSs in the downlink from the macro node 12.

FIG. 10 illustrates a HetNet 26 according to another embodiment of the present disclosure. In this embodiment, the HetNet 26 includes a macro node 28 that serves a corresponding macro cell 30 and a Closed Subscriber Group (CSG) femto node 32 (hereinafter femto node 32) that serves subscribers in a corresponding CSG femto cell 34 (hereinafter femto cell 34). In the illustrated example, a UE 36 is a subscriber of the femto node 32 and, as such, the UE 36 is served by the femto node 32. However, UE 38 is not a subscriber of the femto node 32 and, as such, the UE 38 is served by the macro node 28. Therefore, the macro node 28 operates to serve UEs in the femto cell 34 that are not subscribers of the femto node 32 as well as UEs, such as the UE 40, that are otherwise located in the macro cell 30. Preferably, transmissions to and from the macro node 28 are synchronized with transmissions to and from the femto node 32.

In this embodiment, the femto node 32 applies ABSs in the downlink from the femto node 32 to the subscribers of the femto node 32 located in the femto cell 34. In one embodiment, the femto node 32 uses the process described above with respect to FIGS. 4 through 6 to time-align scheduling instants scheduled according to a scheduling scheme that does not require control information for each subframe and subframes in the uplink to the femto node 32 that correspond to ABSs in the downlink from the femto node 32. As discussed above, the scheduling scheme may be TTI bundling, SPS, PS, or the like. As such, subframes in the uplink to the femto node 32 for which no transmissions would have been scheduled as a result of the ABSs in the downlink from the femto node 32 are used, thereby improving the spectral efficiency of the femto node 32. In addition or alternatively, the femto node 32 may use the process described above with respect to FIGS. 8 and 9 to time-align scheduling instants for the downlink scheduled according to a scheduling scheme that does not require control information for each subframe and at least some of the ABSs in the downlink from the femto node 32. As discussed above, the scheduling scheme may be TTI bundling, SPS, PS, or the like. As such, at least some of the ABSs in the downlink that would have otherwise included no data are used, thereby improving the spectral efficiency of the femto node 32.

FIG. 11 illustrates a HetNet 42 according to another embodiment of the present disclosure. In this embodiment, the HetNet 42 includes a macro node 44 that serves a corresponding macro cell 46, a CSG femto node 48 (hereinafter femto node 48) that serves subscribers in a corresponding CSG femto cell 50 (hereinafter femto cell 50), and a pico node 52 that serves a corresponding pico cell 54 and expansion region 56. In the illustrated example, a UE 58 is a subscriber of the femto node 48 and, as such, the UE 58 is served by the femto node 48. However, UE 60 is not a subscriber of the femto node 48 and, as such, the UE 60 is served by the macro node 44. UE 62 is located in the pico cell 54 and is therefore served by the pico node 52. The macro node 44 operates to serve UEs in the femto cell 50 that are not subscribers of the femto node 48 as well as UEs, such as UE 64, that are otherwise located in the macro cell 46 but outside of the pico cell 54 and the expansion region 56 of the pico node 52. Preferably, transmissions to and from the macro node 44 are synchronized with transmissions to and from the femto node 48 and transmissions to and from the pico node 52.

In this embodiment, the femto node 48 applies ABSs in the downlink from the femto node 48 to the subscribers of the femto node 48 located in the femto cell 50. In one embodiment, the femto node 48 uses the process described above with respect to FIGS. 4 through 6 to time-align scheduling instants scheduled according to a scheduling scheme that does not require control information for each subframe and subframes in the uplink to the femto node 48 that correspond to ABSs in the downlink from the femto node 48. As discussed above, the scheduling scheme may be TTI bundling, SPS, PS, or the like. As such, subframes in the uplink to the femto node 48 for which no transmissions would have been scheduled as a result of the ABSs in the downlink from the femto node 48 are used, thereby improving the spectral efficiency of the femto node 48. In addition or alternatively, the femto node 48 may use the process described above with respect to FIGS. 8 and 9 to time-align scheduling instants for the downlink scheduled according to a scheduling scheme that does not require control information for each subframe and at least some of the ABSs in the downlink from the femto node 48. As discussed above, the scheduling scheme may be TTI bundling, SPS, PS, or the like. As such, at least some of the ABSs in the downlink that would have otherwise included no data are used, thereby improving the spectral efficiency of the femto node 48.

FIG. 12 illustrates a HetNet that provides uplink interference cancellation according to one embodiment of the present disclosure. As illustrated, the HetNet includes a macro node serving a corresponding macro cell, a LPN serving a LPN cell, and UEs, namely, UE1 and UE2. The macro node sends PDCCH information to UE2 to schedule a transmission for UE2 in the uplink to the macro node (step 400). Preferably, the PDCCH schedules a TTI bundle for UE2 in the uplink to the macro node. However, other types of scheduling such as, for example, SPS or PS may be used. In addition, the macro node sends the PDCCH information for UE2 to the LPN via an inter-node communication interface (e.g., an X2 interface or other backhaul network interface) (step 402). Thereafter, UE2 sends a transmission using the scheduled resources of the uplink to the macro node (step 404). Again, preferably, the transmission is a TTI bundle using the scheduled resources of the uplink to the macro node. At that same time, UE1 transmits data to the LPN using the same resources of the uplink to the LPN (step 406).

In order to cancel interference for the transmission from UE1 to the LPN, the LPN stores the uplink transmission from UE1 (step 408). In addition, the LPN receives the transmission from UE2 in the uplink to the macro node and processes the transmission to train one or more parameters for interference cancellation for canceling the interference caused in the uplink transmission from UE1 (step 410). More specifically, preferably, the transmission from UE2 is a TTI bundle. The TTI bundle includes four transmissions of the same data, but the four transmissions are coded differently (i.e., Incremental Redundancy, in order to obtain coding gains). If the LPN is able to decode the first transmission of the TTI bundle correctly, the LPN can then train the parameters for the interference cancellation using the remaining transmissions in the TTI bundle, which use the same physical resource blocks but using different known coding. Note, however, this same process may be used even if the LPN needs the first two or even three of the transmissions to successfully decode the data, where the remaining transmissions after the successful decode are used to train the parameters for interference cancellation. A similar process may be used to train the interference cancellation using SPS or PS. Lastly, the LPN performs interference cancellation for the stored uplink transmission from UE1 using the parameters determined in step 410 (step 412). In this manner, interference cancellation is performed to remove, or at least substantially remove, the interference in the uplink transmission from UE1 to the LPN caused by the uplink transmission from UE2 to the macro node.

FIG. 13 illustrates a HetNet that provides downlink interference cancellation according to one embodiment of the present disclosure. As illustrated, the HetNet includes a macro node serving a corresponding macro cell, a LPN serving a LPN cell, and UEs, namely, UE1 and UE2. The macro node sends PDCCH information to UE2 to a repetitive downlink transmission (e.g., a TTI bundle or an ARQ retransmission) for UE2 in the downlink to the macro node (step 500). In addition, the macro node sends the PDCCH information for UE2 to the LPN via an inter-node communication interface (e.g., an X2 interface or other backhaul network interface) (step 502). The LPN then sends the PDCCH information for UE2 to UE1 via, for example, RRC signaling (step 504). Thereafter, the macro node transmits to UE1 using the scheduled resources of the downlink from the macro node (step 506). At that same time, the LPN transmits data to UE1 using the same resources of the downlink from the LPN (step 508).

In order to cancel interference for the downlink transmission from the LPN to UE1, UE1 stores the downlink transmission from the LPN (step 510). In addition, UE1 receives the downlink transmission from the macro node to UE2 using the PDCCH information received from the LPN and processes the downlink transmission to train one or more parameters for interference cancellation (step 512). Here, the interference cancellation is to cancel interference in the downlink transmission to UE1 resulting from the downlink transmission to UE2. Lastly, UE1 performs interference cancellation for the stored downlink transmission from the LPN using the parameters determined in step 512 (step 514). In this manner, interference cancellation is performed to remove, or at least substantially remove, the interference in the downlink transmission from the LPN to UE1 caused by the downlink transmission from the macro node to UE2.

FIG. 14 is a block diagram of a macro node 66 according to one embodiment of the present disclosure. The macro node 66 may be the macro node 12 of FIG. 1, the macro node 28 of FIG. 10, or the macro node 44 of FIG. 11. The macro node 66 includes a transceiver subsystem 68, an inter-node communication interface 70, and a processing subsystem 72. The transceiver subsystem 68 generally includes analog and, in some embodiments, digital components for sending and receiving communications to and from UEs within the macro cell of the macro node 66. The inter-node communication interface 70 generally includes analog and, in some embodiments, digital components for sending and receiving communications to and from other nodes (i.e., other macro nodes and, in some embodiments, neighboring pico nodes and/or neighboring femto nodes). From a communications protocol view, the transceiver subsystem 68 and the inter-node communication interface 70 implement at least part of Layer 1 (i.e., the Physical or "PHY" Layer). The processing subsystem 72 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 68, the inter-node communication interface 70, and the processing subsystem 72, will vary depending on both the particular implementation as well as the standard or standards supported by the macro node 66. In some embodiments, the processing subsystem 72 generally operates to time-align scheduling instants with subframes in the uplink that correspond to ABSs in the downlink and/or time-align scheduling instants in the downlink with ABSs in the downlink, as described above.

Those skilled in the art will appreciate that the block diagram of the macro node 66 necessarily omits numerous features that are not necessary to a complete understanding of this disclosure. For instance, although all of the details of the processing subsystem 72 are not illustrated, those skilled in the art will recognize that the processing subsystem 72 comprises one or several general-purpose or special-purpose microprocessors or other microcontrollers programmed with suitable software and/or firmware to carry out some or all of the functionality of the macro node 66 described herein. In addition or alternatively, the processing subsystem 72 may comprise various digital hardware blocks (e.g., one or more Application Specific Integrated Circuits (ASICs), one or more off-the-shelf digital and analog hardware components, or a combination thereof) configured to carry out some or all of the functionality of the macro node 66 described herein.

FIG. 15 is a block diagram of a femto node 74 according to one embodiment of the present disclosure. The femto node 74 may be the femto node 32 of FIG. 10 or the femto node 48 of FIG. 11. The femto node 74 includes a transceiver subsystem 76, an inter-node communication interface 78, and a processing subsystem 80. The transceiver subsystem 76 generally includes analog and, in some embodiments, digital components for sending and receiving communications to and from subscribers within the femto cell of the femto node 74. The inter-node communication interface 78 generally includes analog and, in some embodiments, digital components for sending and receiving communications to and from other nodes (i.e., macro nodes and, in some embodiments, neighboring pico nodes and/or neighboring femto nodes). From a communications protocol view, the transceiver subsystem 76 and the inter-node communication interface 78 implement at least part of Layer 1 (i.e., the Physical or "PHY" Layer). The processing subsystem 80 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 76, the inter-node communication interface 78, and the processing subsystem 80, will vary depending on both the particular implementation as well as the standard or standards supported by the femto node 74. In some embodiments, the processing subsystem 80 generally operates to time-align scheduling instants with subframes in the uplink that correspond to ABSs in the downlink and/or time-align scheduling instants in the downlink with ABSs in the downlink, as described above.

Those skilled in the art will appreciate that the block diagram of the femto node 74 necessarily omits numerous features that are not necessary to a complete understanding of this disclosure. For instance, although all of the details of the processing subsystem 80 are not illustrated, those skilled in the art will recognize that the processing subsystem 80 comprises one or several general-purpose or special-purpose microprocessors or other microcontrollers programmed with suitable software and/or firmware to carry out some or all of the functionality of the femto node 74 described herein. In addition or alternatively, the processing subsystem 80 may comprise various digital hardware blocks (e.g., one or more ASICs, one or more off-the-shelf digital and analog hardware components, or a combination thereof) configured to carry out some or all of the functionality of the femto node 74 described herein.

FIG. 16 is a block diagram of a UE 82 according to one embodiment of the present disclosure. The UE 82 may be any one of the UEs of FIGS. 1, 10, and 11. The UE 82 includes a transceiver subsystem 84 and a processing subsystem 86. The transceiver subsystem 84 generally includes analog and, in some embodiments, digital components for sending and receiving communications to and from a macro node, a femto node, or a pico node. From a communications protocol view, the transceiver subsystem 84 implements at least part of Layer 1 (i.e., the Physical or "PHY" Layer). The processing subsystem 86 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 84 and the processing subsystem 86, will vary depending on both the particular implementation as well as the standard or standards supported by the UE 82.

Those skilled in the art will appreciate that the block diagram of the UE 82 necessarily omits numerous features that are not necessary to a complete understanding of this disclosure. For instance, although all of the details of the processing subsystem 86 are not illustrated, those skilled in the art will recognize that the processing subsystem 86 comprises one or several general-purpose or special-purpose microprocessors or other microcontrollers programmed with suitable software and/or firmware to carry out some or all of the functionality of the UE 82 described herein. In addition or alternatively, the processing subsystem 80 may comprise various digital hardware blocks (e.g., one or more ASICs, one or more off-the-shelf digital and analog hardware components, or a combination thereof) configured to carry out some or all of the functionality of the UE 82 described herein.

The following acronyms are used throughout this disclosure.
ABS Almost Blank Subframe
ARQ Automatic Repeat Request
ASIC Application Specific Integrated Circuit
BS Base Station
CRS Common, or Cell-Specific, Reference Signal
CSG Closed Subscriber Group
dBm Decibel-Milliwatt
DCI Downlink Control Information
DL Downlink
HetNet Heterogeneous Network
LP Low Power
LPN Low Power Node
LTE Long Term Evolution
PCFICH Physical Control Format Indicator Channel
PDCCH Physical Downlink Control Channel
PDSCH Physical Downlink Shared Channel
PHICH Physical Hybrid-ARQ Indicator Channel
PS Persistent Scheduling
QoS Quality-of-Service
RE Range Extension
RRC Radio Resource Control
RSRP Reference Signal Received Power
RSS Received Signal Strength
SPS Semi-Persistent Scheduling
TTI Transmit Time Interval
UE User Equipment Device
UL Uplink Those skilled in the art will recognize improvements and modifications to the preferred embodiments of the present disclosure. All such improvements and modifications are considered within the scope of the concepts disclosed herein and the claims that follow.

What is claimed is:

1. A method of operation of an access node in a cellular communication network, comprising:
applying almost blank subframes in a downlink from the access node;
identifying one or more user equipment devices for which transmissions are to be scheduled using a scheduling scheme that does not require control information for every subframe scheduled by the scheduling scheme; and
time-aligning scheduling instants of the one or more user equipment devices and subframes that correspond to at least some of the almost blank subframes in the downlink.

2. The method of claim 1 wherein:
identifying the one or more user equipment devices comprises identifying one or more user equipment devices for which transmissions are to be scheduled in an uplink to the access node using the scheduling scheme that does not require control information for every subframe scheduled by the scheduling scheme; and time-aligning the scheduling instants of the one or more user equipment devices and subframes that correspond to the at least some of the almost blank subframes in the downlink comprises time-aligning the scheduling instants of the one or more user equipment devices for the uplink with subframes in the uplink that correspond to the at least some of the almost blank subframes in the downlink.

3. The method of claim 2 wherein the almost bank subframes in the downlink do not contain control information for corresponding subframes in the uplink.

4. The method of claim 2 wherein the subframes in the uplink that correspond to the at least some of the almost blank subframes in the downlink are subframes in the uplink that occur a predefined amount of time after the at least some of the almost blank subframes in the downlink.

5. The method of claim 2 wherein the subframes in the uplink that correspond to the at least some of the almost blank subframes in the downlink are subframes in the uplink that occur four transmit time intervals after the at least some of the almost blank subframes in the downlink.

6. The method of claim 2 wherein the scheduling scheme is TTI bundling.

7. The method of claim 6 wherein time-aligning the scheduling instants of the one or more user equipment devices for the uplink with subframes in the uplink that correspond to the at least some of the almost blank subframes in the downlink comprises, for each user equipment device of the one or more user equipment devices, scheduling a transmission of a TTI bundle for subframes of the uplink that include at least one subframe in the uplink that corresponds to an almost blank subframe in the downlink.

8. The method of claim 6 wherein the access node is a macro node, and the method further comprises providing control information related to scheduling of a TTI bundle for a user equipment device of the one or more user equipment devices to a neighboring low power node in the cellular communication network.

9. The method of claim 8 wherein the neighboring low power node utilizes the control information to receive the TTI bundle from the user equipment device in the uplink to the macro node and perform interference cancellation for an uplink from a second user equipment device to the neighboring low power node.

10. The method of claim 2 wherein the scheduling scheme is a semi-persistent scheduling scheme.

11. The method of claim 10 wherein time-aligning the scheduling instants of the one or more user equipment devices for the uplink with subframes in the uplink that correspond to the at least some of the almost blank subframes in the downlink comprises, for each user equipment device of the one or more user equipment devices, scheduling a plurality of semi-persistent scheduling instants for the user equipment device such that at least a subset of the plurality of semi-persistent scheduling instants for the user equipment device are scheduled for subframes in the uplink that correspond to almost blank subframes in the downlink.

12. The method of claim 2 wherein the scheduling scheme is a persistent scheduling scheme.

13. The method of claim 12 wherein time-aligning the scheduling instants of the one or more user equipment devices for the uplink with subframes in the uplink that correspond to the at least some of the almost blank subframes in the downlink comprises, for each user equipment device of the one or more user equipment devices, scheduling a plurality of persistent scheduling instants for the user equipment device such that at least a subset of the plurality of persistent scheduling instants for the user equipment device are scheduled for subframes in the uplink that correspond to almost blank subframes in the downlink.

14. The method of claim 1 wherein:

identifying the one or more user equipment devices comprises:

identifying one or more non-interfering user equipment devices that are determined to not interfere with any neighboring pico nodes; and identifying one or more user equipment devices from the one or more non-interfering user equipment devices for which downlink transmissions are to be scheduled using the scheduling scheme that does not require control information for every subframe scheduled by the scheduling scheme; and time-aligning the scheduling instants of the one or more user equipment devices and subframes that correspond to the at least some of the almost blank subframes in the downlink comprises time-aligning the scheduling instants of the one or more user equipment devices for the downlink with the at least some of the almost blank subframes in the downlink.

15. The method of claim 14 further comprising reducing a transmit power level for the downlink during transmission of the at least some of the almost blank subframes in the downlink.

16. The method of claim 14 wherein the almost bank subframes in the downlink do not contain control information.

17. The method of claim 14 wherein the scheduling scheme is a semi-persistent scheduling scheme.

18. The method of claim 17 wherein time-aligning the scheduling instants of the one or more user equipment devices for the downlink with the at least some of the almost blank subframes in the downlink comprises, for each user equipment device of the one or more user equipment devices, scheduling a plurality of semi-persistent scheduling instants for the user equipment device such that at least a subset of the plurality of semi-persistent scheduling instants for the user equipment device are scheduled for almost blank subframes in the downlink.

19. The method of claim 17 wherein time-aligning the scheduling instants of the one or more user equipment devices for the downlink with the at least some of the almost blank subframes in the downlink comprises, for each user equipment device of the one or more user equipment devices, scheduling a plurality of persistent scheduling instants for the user equipment device such that at least a subset of the plurality of persistent scheduling instants for the user equipment device are scheduled for almost blank subframes in the downlink.

20. The method of claim 14 wherein the scheduling scheme is a persistent scheduling scheme.

21. The method of claim 1 wherein the access node is a macro node.

22. The method of claim 21 wherein transmissions for the macro node are synchronized with transmissions for a neighboring low power node.

23. The method of claim 1 wherein the access node is a closed subscriber group femto node.

24. The method of claim 23 wherein transmissions for the closed subscriber group femto node are synchronized with transmissions for a neighboring macro node.

25. The method of claim 1 wherein the almost blank subframes in the downlink are arranged according to a predetermined almost blank subframe pattern, and time-aligning the scheduling instants of the one or more user equipment devices and subframes that correspond to the at least some of the almost blank subframes in the downlink comprises scheduling the scheduling instants of the one or more user equipment devices according to the predetermined almost blank subframe pattern.

26. The method of claim 1 wherein time-aligning the scheduling instants of the one or more user equipment devices and subframes that correspond to the at least some of the almost blank subframes in the downlink comprises adjusting an almost blank subframe pattern for the almost blank subframes in the downlink such that the scheduling instants of the one or more user equipment devices are time-aligned with subframes that correspond to the at least some of the almost blank subframes in the downlink.

27. An access node in a cellular communication network, comprising:
   a transceiver subsystem adapted to provide a downlink and an uplink to user equipment devices served by the access node; and
   a processing subsystem associated with the transceiver subsystem and adapted to:
      apply almost blank subframes in the downlink from the access node;
      identify one or more user equipment devices for which transmissions are to be scheduled using a scheduling scheme that does not require control information for every subframe scheduled by the scheduling scheme; and
      time-align scheduling instants of the one or more user equipment devices and subframes that correspond to at least some of the almost blank subframes in the downlink.

28. The access node of claim 27 wherein:
   the one or more user equipment devices are one or more user equipment devices for which uplink transmissions are to be scheduled in an uplink to the access node using the scheduling scheme that does not require control information for every subframe scheduled by the scheduling scheme; and
   the scheduling instants of the one or more user equipment devices are scheduling instants of the one or more user equipment devices for the uplink that are time-aligned with subframes in the uplink that correspond to the at least some of the almost blank subframes in the downlink.

29. The access node of claim 28 wherein the almost bank subframes in the downlink do not contain control information for corresponding subframes in the uplink.

30. The access node of claim 28 wherein the subframes in the uplink that correspond to the at least some of the almost blank subframes in the downlink are subframes in the uplink that occur a predefined amount of time after the at least some of the almost blank subframes in the downlink.

31. The access node of claim 28 wherein the subframes in the uplink that correspond to the at least some of the almost blank subframes in the downlink are subframes in the uplink that occur four transmit time intervals after the at least some of the almost blank subframes in the downlink.

32. The access node of claim 28 wherein the scheduling scheme is TTI bundling.

33. The access node of claim 28 wherein the scheduling scheme is a semi-persistent scheduling scheme.

34. The access node of claim 28 wherein the scheduling scheme is a persistent scheduling scheme.

35. The access node of claim 27 wherein the access node is a macro node, and:
   the one or more user equipment devices are one or more user equipment devices determined to not interfere with any neighboring pico nodes of the macro node and for which downlink transmissions are to be scheduled using the scheduling scheme that does not require control information for every subframe scheduled by the scheduling scheme; and
   the scheduling instants of the one or more user equipment devices are time-aligned with the at least some of the almost blank subframes in the downlink.

36. The access node of claim 35 wherein the processing subsystem is further adapted to reduce a transmit power level for the downlink during transmission of the almost blank subframes in the downlink.

37. The access node of claim 35 wherein the almost bank subframes in the downlink do not contain control information.

38. The access node of claim 27 wherein the scheduling scheme is a semi-persistent scheduling scheme.

39. The access node of claim 27 wherein the scheduling scheme is a persistent scheduling scheme.

40. The access node of claim 27 wherein the access node is a macro node.

41. The access node of claim 40 wherein transmissions for the macro node are synchronized with transmissions for a neighboring low power node.

42. The access node of claim 27 wherein the access node is a closed subscriber group femto node.

43. The access node of claim 42 wherein transmissions for the closed subscriber group femto node are synchronized with transmissions for a neighboring macro node.

* * * * *